US005755255A

United States Patent [19]
Iwabuchi

[11] Patent Number: 5,755,255
[45] Date of Patent: May 26, 1998

[54] GATE VALVE FOR REGULATING GAS FLOW IN SEMICONDUCTOR MANUFACTURING

[75] Inventor: Toshiaki Iwabuchi, Gunma-Ken, Japan

[73] Assignee: Benkan Corporation, Tokyo, Japan

[21] Appl. No.: 790,938

[22] Filed: Jan. 29, 1997

[30] Foreign Application Priority Data

Oct. 29, 1996 [JP] Japan .................................. 8-303679

[51] Int. Cl.⁶ .................................................. F16K 49/00
[52] U.S. Cl. ............................ 137/341; 251/203; 251/158; 251/335.3
[58] Field of Search ............................. 251/203, 158, 251/176, 335.3; 137/341

[56] References Cited

U.S. PATENT DOCUMENTS

| | | | |
|---|---|---|---|
| 3,258,244 | 6/1966 | Hilton | 251/203 |
| 4,187,965 | 2/1980 | Aliprandi et al. | 251/203 |
| 4,534,540 | 8/1985 | Bragin et al. | 251/203 |
| 4,718,637 | 1/1988 | Contin | 251/203 |

Primary Examiner—Denise L. Ferensic
Assistant Examiner—John Ball
Attorney, Agent, or Firm—Eric P. Schellin

[57] ABSTRACT

A friction-free gate valve for regulating gas flow in semiconductor manufacturing comprises a gate which, prior to being lifted up for the valve-opening position, is horizontally flitted away from the passage wall surface against which it was pressed against for valve closure, lest undesirable frittered particles should occur from rubbing the gate against the passage wall surface. The gate is axially coupled to and made integral with a vertically and horizontally movably disposed valve stem. The valve stem is also operatively coupled to a cam mechanism which is actuated by a reciprocating piston rod which, in an earlier part of its stroke, drives vertically the valve stem through the cam mechanism, moving the gate to a lower position where the gate blocks the passage. While the piston rod further moves to cover the remaining part of stroke, additional pressure exerted on the cam mechanism causes the valve stem to tilt, thereby pressing the gate into tight contact with the opposed wall surface of the passage. When the gate is moved out of the passage, the steps are followed backward, by starting the piston rod to reverse the stroke. The gate is first caused to edge away from pressure contact with the surface, then is lifted up.

4 Claims, 13 Drawing Sheets

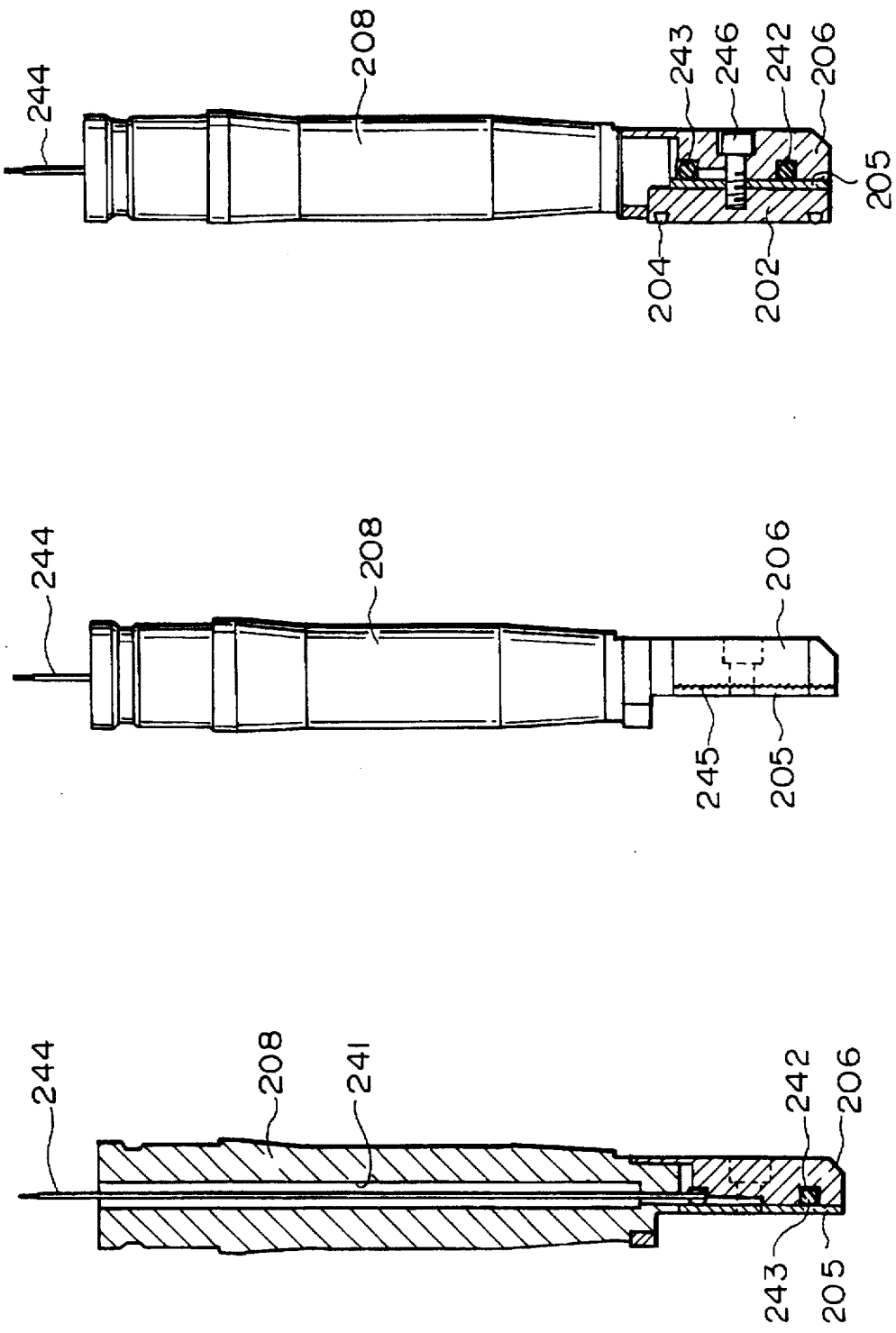

GATE VALVE FOR REGULATING GAS FLOW IN SEMICONDUCTOR MANUFACTURING

BACKGROUND OF THE INVENTION

1) Field of the Invention

This invention relates in general to a gate valve for regulating high purity gas flow in semiconductor manufacturing equipments and, in particular, to such a valve free from frictional contact with passage surfaces to generate frittered particles.

2) Description of the Prior Art

A number of gate valves have been developed for regulating gas flow in semiconductor manufacturing equipment. In a typical conventional gate valve, as schematically illustrated in FIGS. 9–11, a vertically movably disposed pusher 52, which is mounted in a valve seat 58, moves a gate 53 axially in and out of a passage 60, actuated by a reciprocating piston rod 51 through the pusher to which the piston rod is operatively connected.

FIG. 10 shows the gate 53 in its neutral or fully opened position, with cam disks 55 trapped in opposed recesses defined in the sides of the gate 53 and pusher 52. The opposite recesses are staggered between the gate 53 and pusher 52 to hold cam disks 55 in tilted position. Compression springs 59 are mounted strung to urge the gate 53 toward the pusher 52 in to a closely united whole, as can best be shown in FIG. 11A.

When the reciprocating rod 51 actuates the pusher 52 downward, forcing the gate 53 to descend with it into the passage 60, until the lower end of the gate 53 comes into contact with a stopper 54, as shown in FIG. 9, where the gate fully closes the passage 60. As the reciprocating rod 51 further exerts downward pressure on the pusher 52, the latter is compelled to edge downward relative to the gate 53 that is arrested in position by the stopper 54, with the result that the cam disks 55 come into a horizontal position in their now aligned recesses between the gate and pusher, as shown in FIG. 11B. Simultaneously, the flattened cam disks 55 in the recesses hold the pusher 52 to laterally distance the gate 53 against the force of the compression springs 59.

In the fully closed position, the gate 53 thus is pressed against the wall surface of the passage 60. A seal rubber ring 56 circumferentially mounted in the gate surface is brought into abutting contact with the valve seat surface for tight sealing.

When the passage 60 is opened again to the position depicted in FIG. 10, the above steps are followed backward. In ideal operation, the gate 53 is first pulled away laterally from the passage wall surface, with the help of the compression springs 59, into a side-by-side alignment with the pusher 52 so that the cam disks 55 are brought up to their original tilted position in the recesses. Thereafter, the reciprocating rod 51 is retracted to move the pusher 52 upward, along with the gate 53.

However, it often happened that the rubber ring 56 adhered to and refused to detach from the surface of the passage wall surface, due to the heat generated to keep the gate at a temperature enough to prevent it from being contaminated by reaction products that may be blown back into the passage. The intensity of adhesion developed in the sealing ring 56 was too great for the compression springs 59 pull together the gate 53 and pusher 52, so that the assembled whole can be moved back into their upper neutral position. Further attempt to forcefully lift the gate 53, which is still kept pressed against the passage wall surface, causes the sealing rubber 56 to slither up in frictional contact along the wall surface. From this rubbing, frittered particles occur, which likely impair the desired high purity, dust-free environment for semiconductor production.

The present invention has been proposed to eliminate the above-mentioned drawbacks of conventional gate valves.

SUMMARY OF THE INVENTION

It is therefore a primary object of the present invention to offer a gate valve for regulating gas flow in chip manufacturing equipment in which means are provided to insure frictionless movement of the reciprocating gate with the passage wall surface, so that the gate will be smoothly lifted up, even when a vacuum or near vacuum is established in the passage to suck at the gate in the opposite direction.

The frictionlessness is achieved by incorporating facility to disengage the gate clear of the passage wall surface prior to setting it into motion. This disengagement step is particularly required in applications where gates have a sealing ring of resilient material circumferentially fitted in the surface to insure enhanced tight sealing between the passage wall surface and the gate. The gates have to be heated to keep a uniform temperature enough to prevent their surfaces from being contaminated by reaction products that may be blown back into the passage during operation.

It is another object of this invention to provide such a gate valve which provides for easy maintenance by having the gate removably attached in place, so as to allow easy removable for cleaning or replacement of sealing rings.

The above and other features of the present invention are achieved by providing a gas control gate valve for semiconductor making machines, which includes a cam mechanism adapted to work in conjunction with a pneumatic drive to enable the gate to take regulated steps of motion, particularly in valve-opening operation.

The gate is made integral with a vertically extending elongate valve stem from the gate, which conveys the kinetic motion of the pneumatic drive to the gate through the cam unit. Also, the gate is vertically and laterally disposed for movement between a first upper neutral position, where the gate is kept clear away from the passage, a second lower position, where the gate stands to block the passage, and a third inclined position, where the gate is pressed against the wall surface of the passage for tightened sealing.

The interlocked relationship of the valve stem with the cam unit is such that, when the gate valve is operated between the gate's different positions, the joined motions of the cam and valve stem are translated into controlled steps in order of action for the gate; vertical movement relative to the passage followed by lateral movement into or out of pressure contact with the passage wall surface.

The cam unit is operatively coupled, through a horizontal plate mounted on top of it, to the pneumatic drive with a pair of synchronously reciprocating piston rods which directly drive the top plate. Also, the cam unit includes a horizontally arrayed pair of circular cams that are slidably engaged in bent guide grooves defined in opposite inside side walls of a cam casing. The paired cams are fixedly supported in the middle on a cam holder that is made integral with a stem holder mounted in fixed position top of the valve stem.

A pair of compression springs are mounted strung across between the bottom of the cam casing and an opposed surface in the stem holder. The paired springs, which may be held in fixed position immediately below the circular cams, are adapted to normally urge the stem holder into axial alignment with the cam casing above, a position for the gate in its upper neutral position.

The stem holder carries a pair of fulcrums laterally jutted from opposite sides thereof that are slidably engaged in vertical guide grooves defined in opposite surfaces in the valve casing. The guide grooves are adapted to limit, at their lower ends, the downward travel for the stem holder, hence the valve stem, with the fulcrums being brought into abutting contact with the ends.

The valve stem is seated inside a stationary bellows mounted in the casing. The bellows is engaged about the valve stem in such a manner as to normally urge the stem in upward direction so as to hold the gate in the upper neutral position.

With this arrangement, when the pneumatic drive is activated for a opening of the gate, the piston rods are depressed from the upper neutral position to exert downward pressure on the top plate, plunging the cam casing until the descending stem holder is arrested by the fulcrums at the lower ends of the guide grooves, whereupon the gate has just been lowered enough to stand to block the passage. At this point, the piston rods are close to the end of downward stroke, and the cams still remain in their lower neutral position in the bent guide grooves.

The cam mechanism of the cam unit is adapted to convert a later part of the piston rods' downward stroke for a valve closure of the gate into a tilting motion in the valve stem. This tilt results in the gate flitting toward pressure contact against the passage wall surface.

The conversion of the piston rods' vertical reciprocation to a tilt, a primary feature of this invention, is achieved by a design that the cams are held at the lower ends of their guide grooves since the beginning of the piston rods' stroke for an opening movement of the gate and remain there during most of the piston rods' descending stroke until the descending paired fulcrums are stopped by the grooves' lower ends. The remaining travel of the piston rods depresses the cam casing a notch down.

The plunging cam casing thus allows the circular cams, which have just been halted by the bumped fulcrums in the grooves, to slide along their bent grooves in the casing. This shift of the cams results in the cam holder made integral with the cams tilting relative to the cam casing, rotating the associated stem holder about the fulcrums in a direction to bring the gate into abutting contact with the passage wall surface.

When the piston rods complete their stroke, the gate, with its sealing rubber ring circumferentially fitted in the front surface, is further tilted into abutting contact, at circumferential edges, against the passage wall surface for tightened sealing.

The gate is also provided with a heating pad, with a flat sealer interposed therebetween for protecting the pad surface, for heating the gate in order to prevent its surface from being contaminated with reaction products that may be blown back into the passage.

The heating pad may preferably be heated electrically through a linear heating element imbedded circumferentially in the surface of the pad, with an electric wire connected to an external power supply to energize the heating element and passed through an axially hollow defined in the stem.

Alternatively, the heating pad may be heated by circulating heat transfer medium passed through a circumferential heater pipe imbedded in the face of the pad and connected at one end thereof in fluid-flow relationship with a supply passage that is passed through an axial hollow defined in the stem to a source that supplies the heat transfer medium to the heater pipe. An exit passage is connected the other end of the heater pipe and laid in the hollow of the stem to conduct the medium back to the source for reheating.

In either case of heating, the intermediate seal plate is fluid-sealed to the heating pad, and the gate is releasably bolted to the heating pad so that the gate is removed for maintenance or replacement with a new gate.

BRIEF EXPLANATION OF DRAWINGS

FIG. 7B is a vertical cross-sectional view taken along line VIIB—VIIB of FIG. 7A;

FIG. 7C is a side view of the valve in FIG. 7B;

FIG. 7D is a vertical cross-sectional view taken along VIID—VIID of FIG. 7A;

DETAILED DESCRIPTION OF PREFERRED EMBODIMENTS

A preferred embodiment of the gate valve for regulating gas flow in semiconductor manufacturing equipments, designed according to the present invention, will be described in full detail in conjunction with the attached drawings. As will be evident from the description which follows, the valve is designed so that its sliding parts do not make frictional contact with the wall surface of the passage that conducts high purity gas to the chip making facility. Without generating the problems of friction-caused frittered particles as in conventional techniques, the present invention contributes to keeping a clean chip manufacturing environment.

Figure 1:
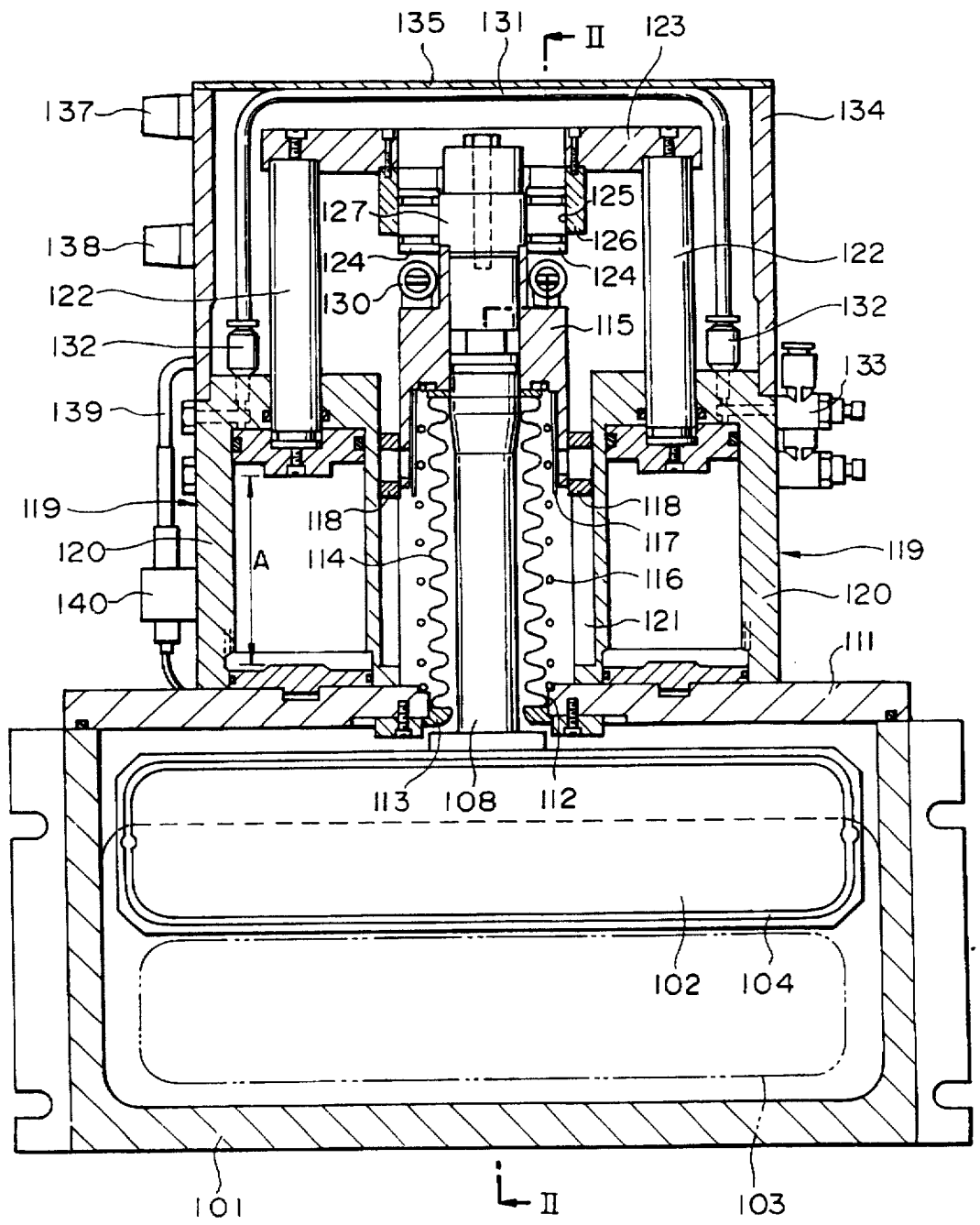
FIG. 1 is a vertical cross-sectional view of a preferred embodiment of the gate valve for regulating gas flow in semiconductor manufacturing equipment, built in accordance with the present invention, as it is in the fully opened position.
Figure 2:
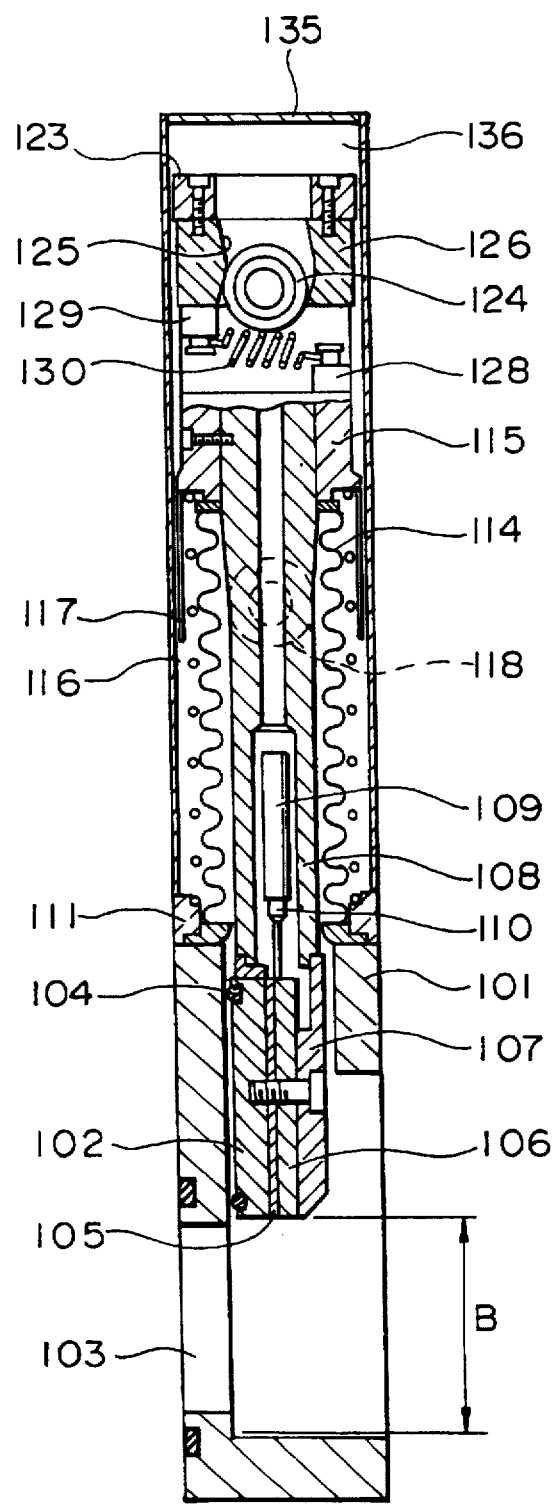
FIG. 2 is a vertical cross-sectional view taken along line II—II of FIG. 1.

Referring first to FIGS. 1 and 2, a gate valve casing 100 has a gate 102, largely square in this embodiment, which opens and closes a passage 103 which conducts a high purity gas to semiconductor manufacturing equipment, not shown. The gate 102 may preferably be formed to have a varying thickness, tapering toward its lower edge.

Figure 4:
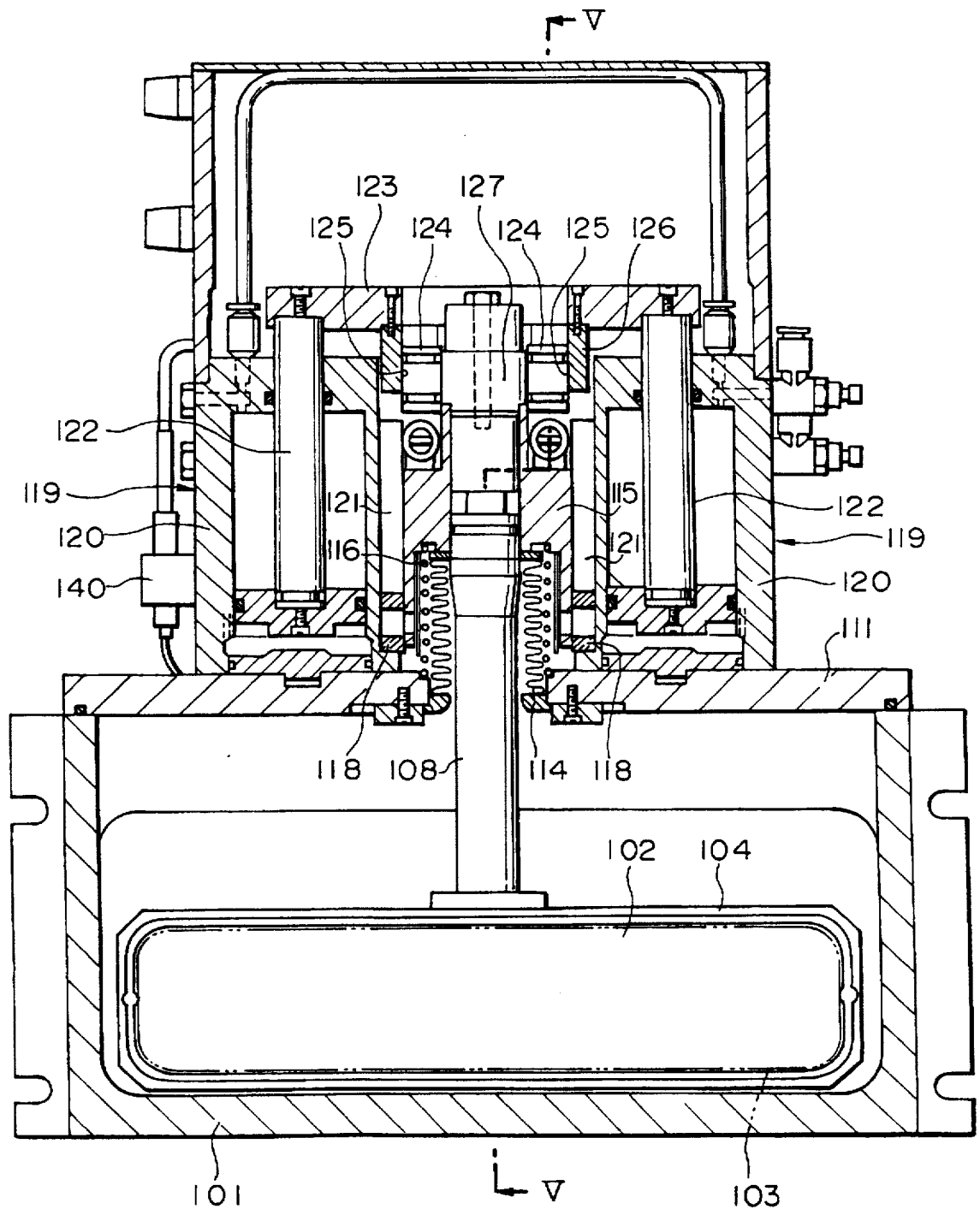
FIG. 4 is a vertical cross-sectional view of the valve in FIG. 1, where the gate is being moved to the closed position.

Also, the gate 102 is vertically and laterally movably disposed for moving between a first upper neutral position, shown in FIG. 1, where the gate valve is held away from the passage 103 to establish a valve fully opened position, a second lower position (depicted in FIG. 4), where the gate stands to block the passage 103 for a valve closed position, and a third displaced position (in FIG. 6), where the gate is held, along peripheral edges thereof, in close contact with opposed wall surfaces in the passage 103 for gas-tight sealing of the passage.

Referring again to FIGS. 1 and 2, the gate 102 includes a seal ring 4 of any elastic material, preferably fluorinated rubber, that is circumferentially mounted in that surface facing the passage wall surfaces and adapted to be elastically pressed against the surfaces for enhanced tight sealing. Mounted on the other surface of the gate 102 is a heating pad 106 which is adapted to keep the gate 102 uniformly warmed at a temperature to protect the gate surface from being contaminated with reaction products that may be blow back into the passage 103.

The heating pad 106 includes a seal plate 105 that is mounted on top of the pad and provided to cover the surface of the pad so that it seals a gas leagages between the gate 102 and the pad 106, as can best be shown in FIG. 2. The seal plate 105 may preferably be identically dimensioned as the heating pad 106. A sheathed heater 109 is provided to heat, by electrothermal conduction, the heating pad 106, and is turned on and off by a thermocouple 110 which senses the temperature of the gate 102 to keep the gate at a predetermined temperature.

The sheathed heater 9, along with the thermocouple 110, may be mounted directly above the gate 102, seated within a hollow formed in a vertically extending valve stem 108 that is coupled at a lower end thereof to the gate through a connecting arm 107.

The valve stem 108 is made integral with the gate 102, and seated in a central hollow 112 defined in a stationary bonnet 111 mounted in the valve casing 100.

Also, the valve stem 108 is inserted into a bellows 114 that is made integral with a fixed flange 113 in the valve casing 101. Furthermore, the stem 108 is fixedly secured at an upper end portion thereof to a valve stem holder 115 that is mounted on top of the bellows 114.

The bellows 114 is engaged about the valve stem 108 in such a manner to urge the valve stem upward in a direction to hold the gate 102 in the upper neutral position.

The bellows 114 is shrouded in a second sheathed heater 116 which is turned on and off by a second thermocouple 117 which monitors the temperature of the bellows 114 to keep the valve stem 108 at a predetermined temperature. The sheathed heater 116 is provided to heat the valve stem 108 for similar reason as the sheathed heater 109 is used for the gate 102.

The sheathed heaters 109 and 116 are connected through by electric lines 139 clustered in a cable holder 140 to an external power supply unit, not shown, through a pair of input terminals 137 and 138, respectively, mounted at an upper portion of the valve casing 100.

Furthermore, the valve stem holder 115 is provided with a pair of fulcrums 118 that jut horizontally from opposite lower sides of the holder. The fulcrums 118 are slidably movably engaged in a pair of vertical opposite guide grooves 121 defined in stationary surfaces in the valve casing 101. Thus, the vertical grooves 121 guide the vertical movement of the stem holder 115 through the fulcrums 118. Also, the paired guide grooves 121 are provided to arrest, in conjunction with the fulcrums 118 at lower ends of the grooves 121, downward movement of the valve stem holder 115, thereby holding the gate 102 at the second lower position.

A pair of vertical pneumatic cylinders 119 are mounted in stationary horizontal plane in the valve casing 101, seated preferably on both sides of the valve stem 108. Each pneumatic cylinder 119 comprises a reciprocating piston rod 122 that is operatively coupled through an upper end thereof to a horizontal top plate 123 on opposite sides of the stem holder 115. Them pneumatic cylinders 119 operate in unison to vertically move the top plate 123 through the piston rods 122, to thereby drive the valve stem 108, hence the gate 102.

The paired piston rods 122 are run by compressed air from an inverted U-shaped piping 131 that opens into the pneumatic cylinders 119 through input nipples 132. The piping 131 is enclosed between a top cover 135 and side plates 134 mounted in an upper portion of the valve casing 101, and connected to an outside source of compressed air, not shown. The pneumatic cylinders 119 may also have a regulator knob 133 to fine-tune the flow of compressed air for metered control of the piston rods 122.

Figure 3:
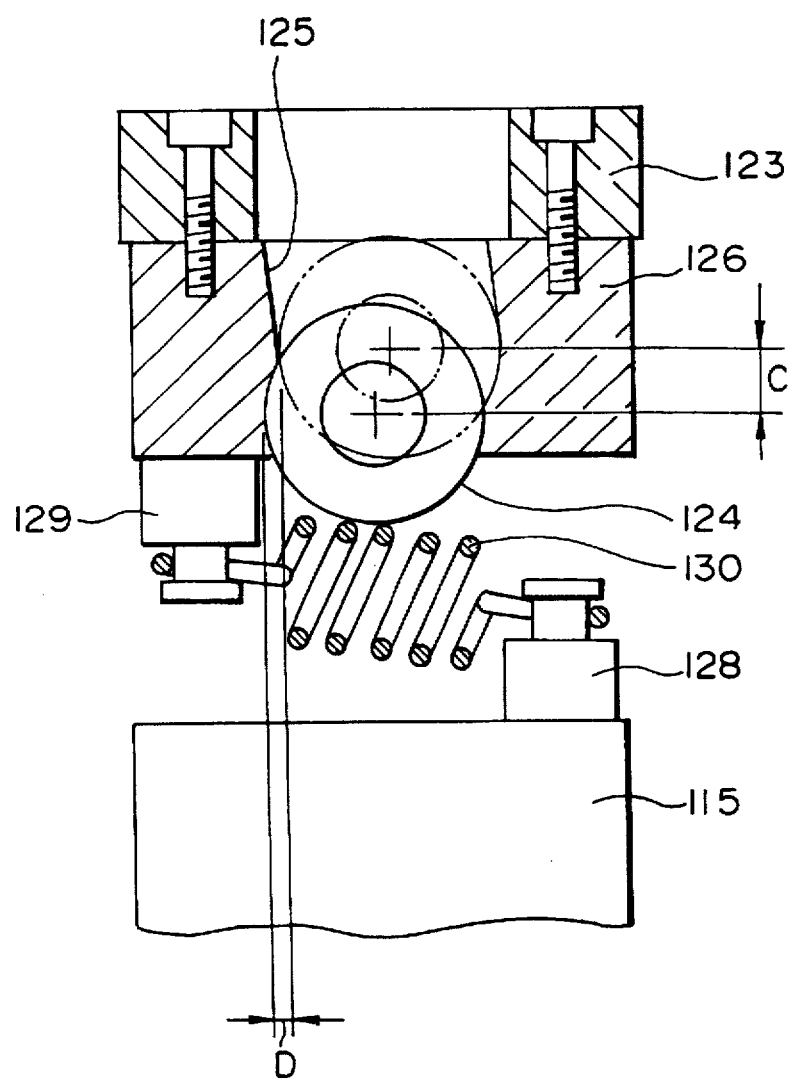
FIG. 3 is a vertical cross-sectional view of the cam system of the gate vale of FIG. 1.

Referring then to FIG. 3, the top plate 123 is made integral with a cam casing 126 that is mounted immediately below the top plate 123. The cam casing 126 includes a pair of cam disks 124 that are laterally spaced apart from each other. Also, the paired cams 124 are vertically slidably engaged in bent guide grooves 125 that are defined in opposed side walls of the cam casing 126. The cams 124 are fixedly secured at their midpoint to a cam holder 124 (FIG. 1) that in turn is made integral with a central top surface in the valve stem holder 115 below.

Thus, the paired cams 124 are slid along the cam grooves 125 between a neutral position, depicted in solid line, and a displaced position, outlined in broken line.

In addition, a pair of compression springs 130 are mounted largely immediately beneath the paired cam disks 124 strung across between the bottom side of the cam casing 126 and the valve stem holder 115 through a pair of fixed spring retainers 129 and 128 to which the springs are hooked at opposite ends. The paired springs 130 are adapted to normally urge the valve stem holder 115 in axial alignment with the cam casing 126.

With this arrangement, in FIG. 3, when the paired cam disks 124 are at their neutral position, the valve stem holder 115 is held in axial alignment with the cam casing 126, holding the gate 102 in the neutral upper position of FIGS. 1 and 2. When the cam disks 124 are shifted along the guide grooves 125 to the displaced position in the cam casing 126, the valve stem holder 115 is inclined out of alignment of the valve casing 126 against the force of the paired springs 130 by the cam holder 127 made integral with the paired cam disks 124. With the cam disks 124 in this position, the valve stem holder 115 is rotated clockwise (in FIG. 6) about the paired fulcrums 118 at their lower end of the guide grooves 121, thereby forcing the gate 102 to tilt into contact with the passage wall surfaces, as can best be depicted in FIG. 6.

The operation of the pneumatic cylinders 119 in interlocked relationship to the top plate 123 is so designed that the piston rods 122 depresses the valve stem 108 against the force of the bellows 114 through the top plate 123 until the valve stem holder 115 is halted by the paired fulcrums 118 that have just come into abutting contact against the lower ends of the vertical guide grooves 121.

Whereupon the gate has just been moved to cover distance B (FIG. 2) to the lower position, but at this moment, the reciprocating piston rods 122 have yet to complete their entire stroke A (FIG. 1).

When the piston rods 122 further travel to complete the stroke A, pressure exerted on the top plate 123 only depresses the cam casing 126 relative to the cam disks 124 that are now prevented from moving down by the halted fulcrums 118 in their guide grooves 121. In FIG. 3, this later descent of the cam casing 126 is expressed as a virtual shift C of the cam disks 124 relative to the cam casing.

This physical downward move of the cam casing 126 is translated into a lateral move D of the cam disks 124 to the right in the drawing, forcing the cam holder 127 to flip in the same direction. As a result, the valve stem holder 115 made integral with the cam holder 127 is moved to the right in FIG. 6 away from axial alignment with the cam casing 126 against the force of the springs 130. Whereupon, the gate is pressed into contact with the opposite wall surfaces of the passage 103 by the rotated valve stem, as illustrated in FIG. 6.

When the valve is opened to establish gas flow through the passage 103 again, the above steps are followed backward. The steps are started by actuating the pneumatic cylinders to retract the piston rods 122 to their upper neutral position.

Figure 6:
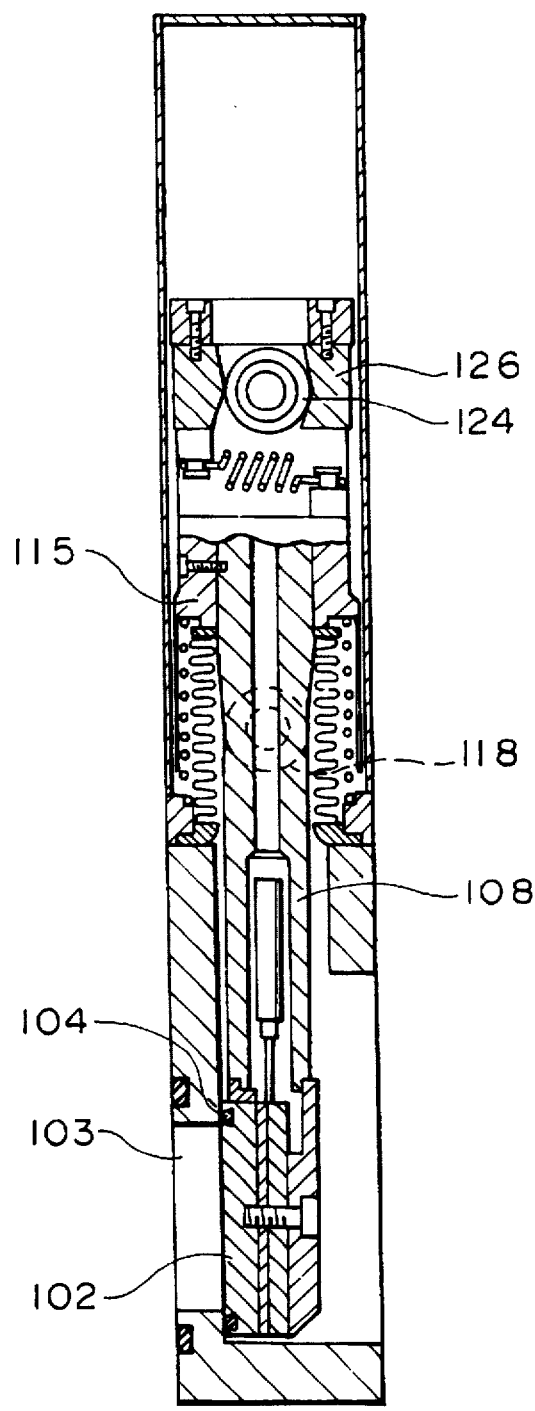
FIG. 6 is a vertical cross-sectional view of the valve of FIG. 1, as it is in its fully-closed position, with the valve face being pressed against the passage wall surface.
Figure 7A:
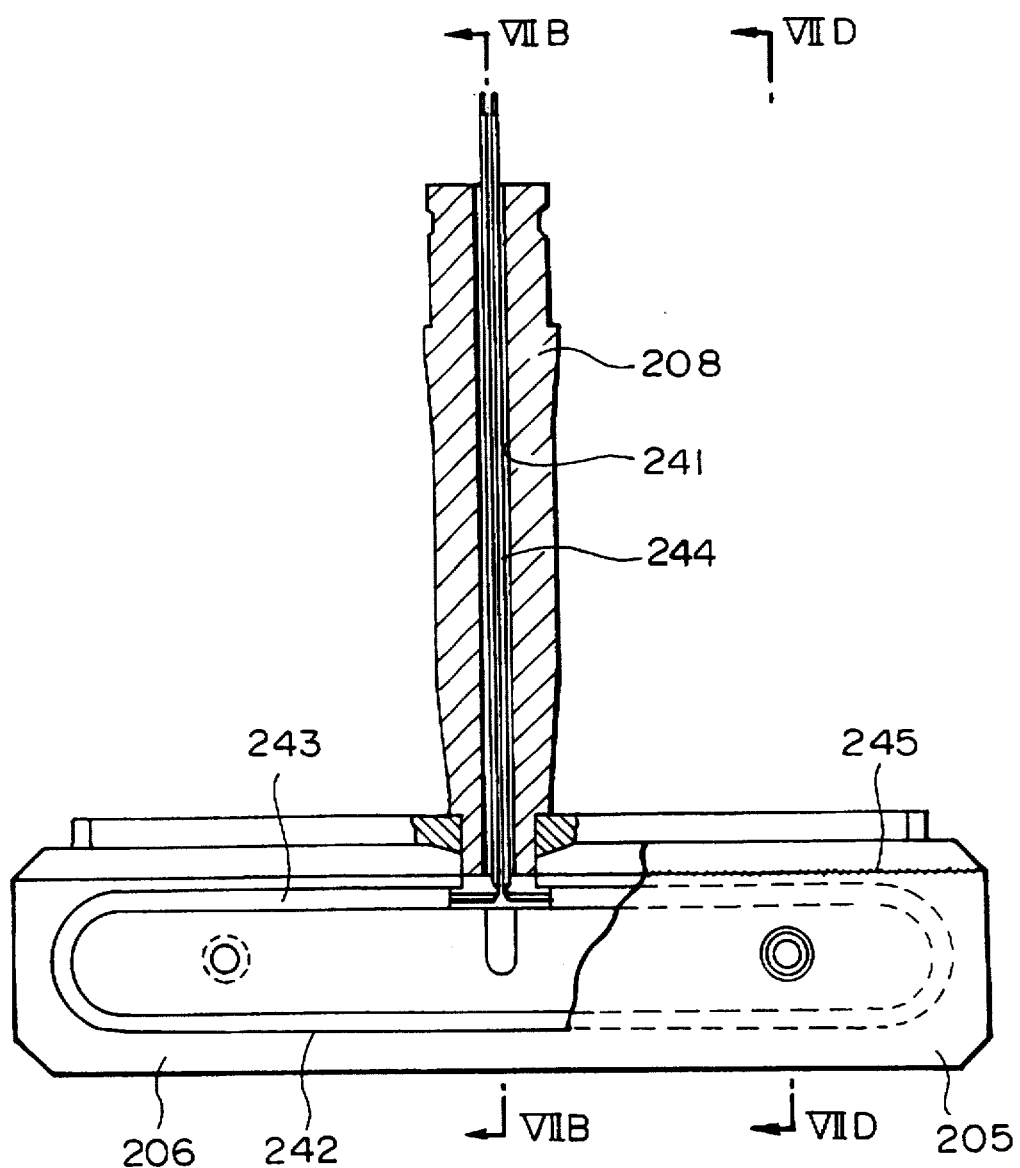
FIG. 7A is a vertical cross-sectional view of a first modification of the gate heating unit for the gate valve according to the present invention.
Figure 8A:
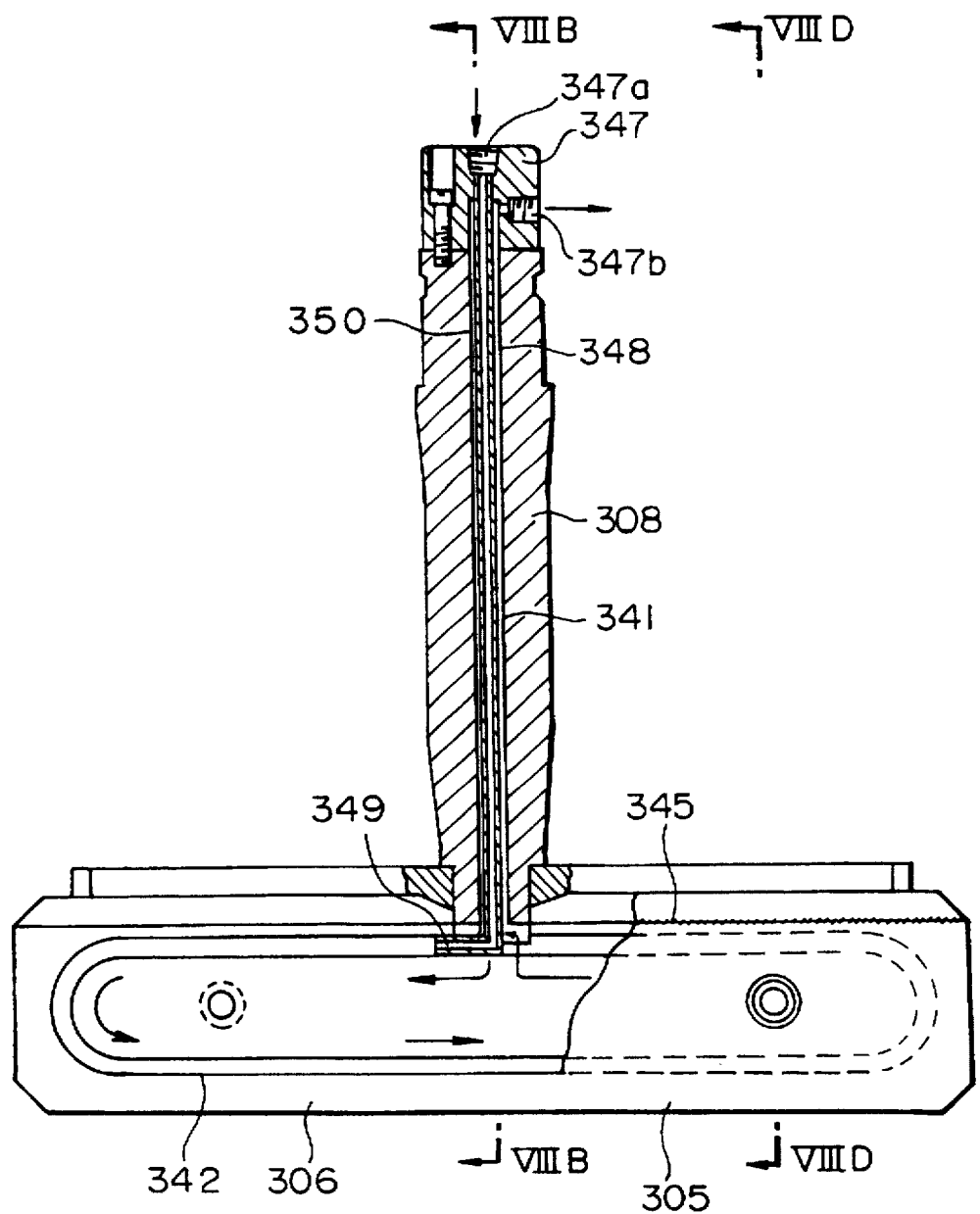
FIG. 8A is a vertical cross-sectional view of a second modification of the heating unit for the gate valve of the present invention.
Figure 8D:
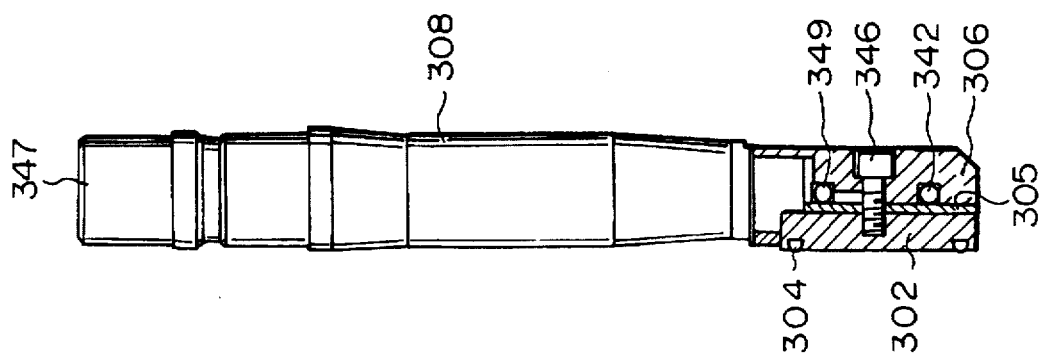
FIG. 8D is a vertical cross-sectional view taken along line VIIID—VIIID of FIG. 8A.
Figure 8C:
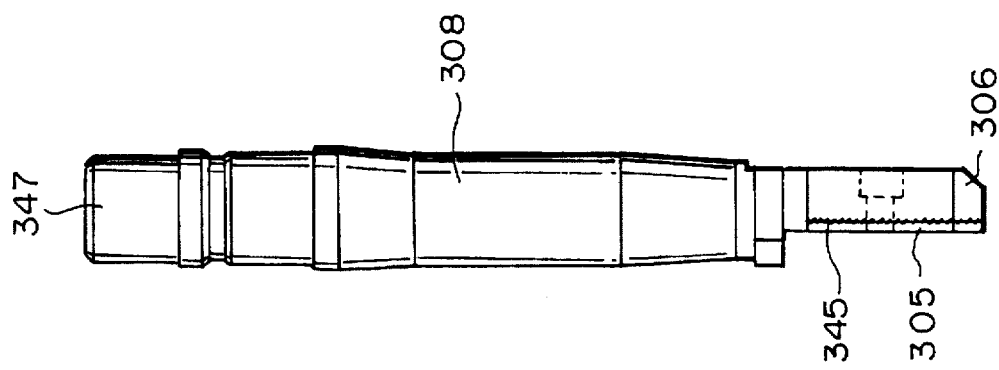
FIG. 8C is a side view of the valve of FIG. 8B.
Figure 8B:
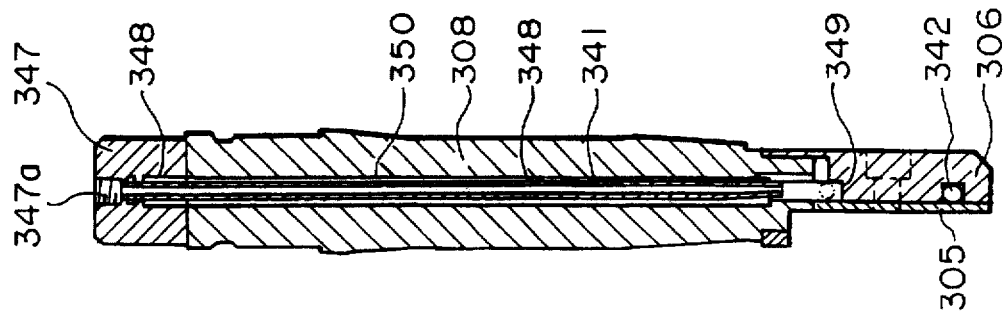
FIG. 8B is a vertical cross-sectional view taken along line VIIIB—VIIIB of FIG. 8A.
Figure 9:
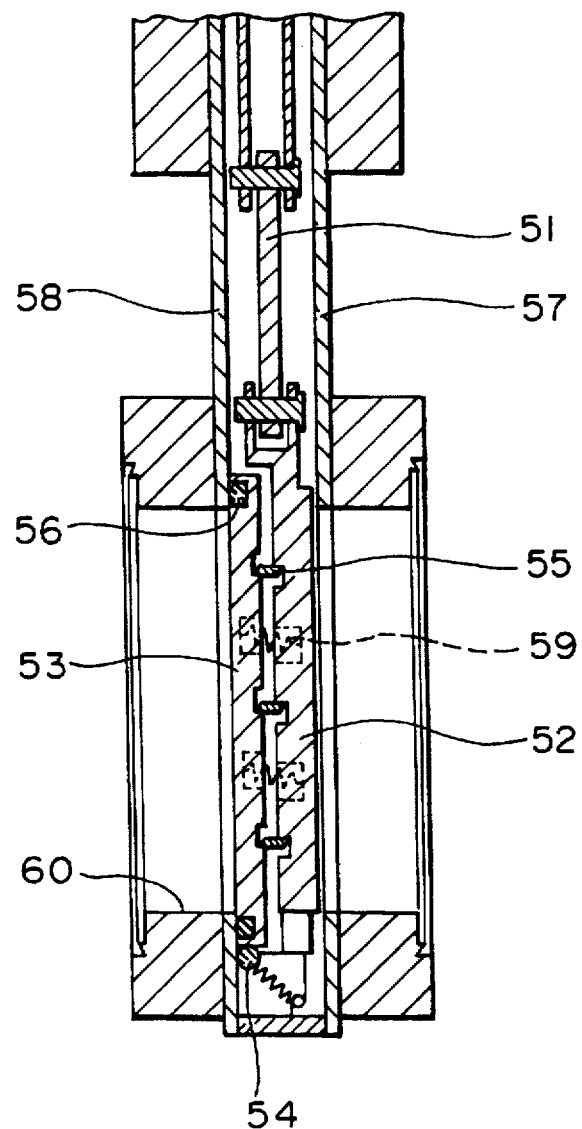
FIG. 9 is a vertical cross-sectional view of a conventional gate valve in its fully-closed position.
Figure 10:
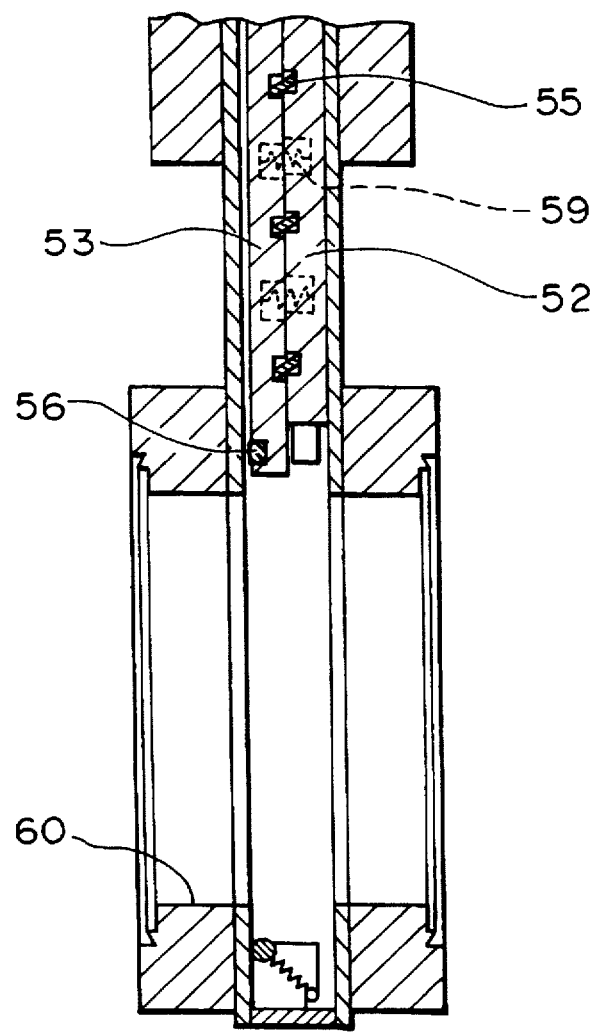
FIG. 10 is a vertical cross-sectional view of the valve shown in FIG. 9 as it is in the fully-opened position.
Figure 11A:
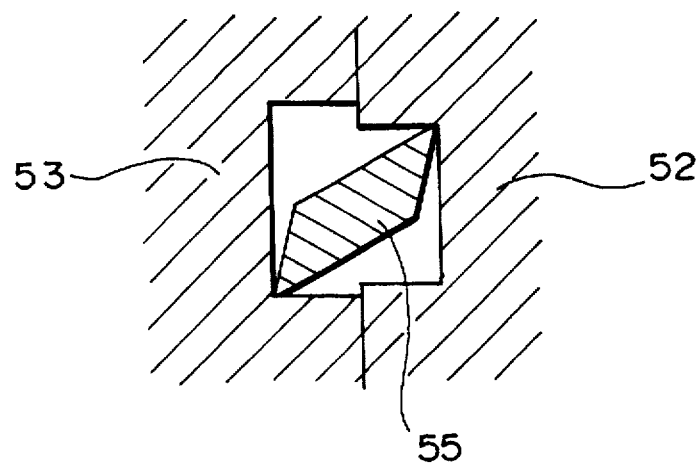
FIG. 11A is a vertical cross-sectional view of the cam disks when the valve of FIG. 9 is in its fully-open position.
Figure 11B:
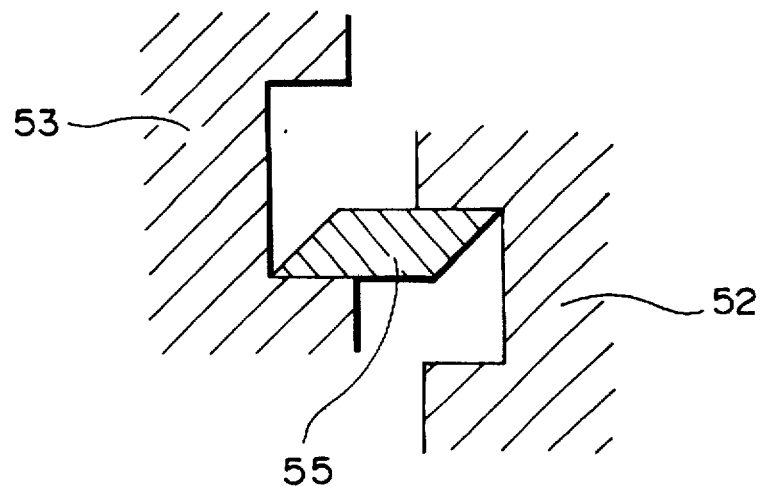
FIG. 11B is a vertical cross-sectional view of the cam disks when the valve of FIG. 9 is in its fully-closed position.

In the early part of upward travel of the piston rods 122, the counterclockwise rotation of the valve stem holder 115 about the fulcrums 118 causes the gate 102 to move away from the wall surfaces of the passage 103 to the left in FIG. 6. Thus, the valve stem holder 115 is brought to an upright position, urged by the compression springs 130, into axial alignment with the cam casing 126, while the cam casing 126 is traveling upward distance C (FIG. 3) with the result that the cam disks retracted back to their neutral position.

Figure 5:
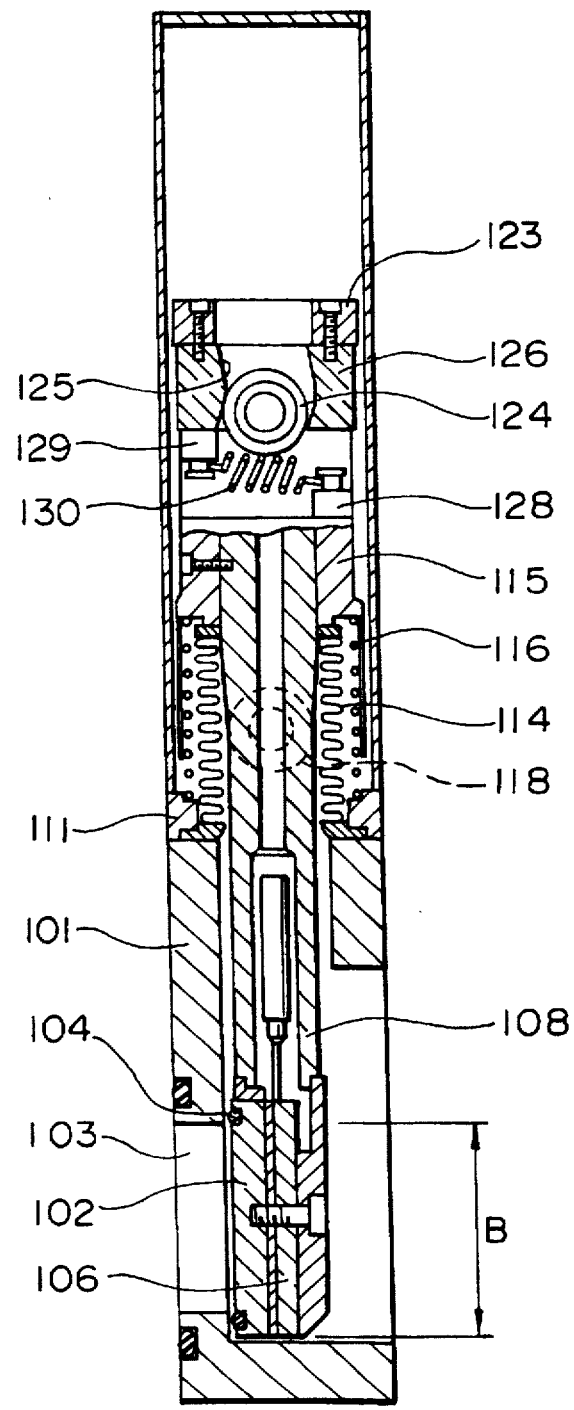
FIG. 5 is a vertical cross-sectional view taken along V—V of FIG. 4, where the gate is just moved into the passage, but not fully closed.

As the piston rods 122 travels to cover the remaining part of upward stroke A (FIG. 1), the top plate 123 is pulled further upward, along with the valve stem 108, urged by the bellows 114. As a result, the gate is moved upward through the distance B (FIG. 5) back to its upper neutral position.

The gate 102 is uniformly heated by the heating pad 106 to keep the gate surface and the seal ring 104 at a temperature that protect them from being contaminated with reaction products likely be blown back into the passage 103.

For similar reason, the bellows 114 is also circumferentially heated by the sheathed heater 116 since the bellows is likewise exposed to escaped gas from the passage 103 during operation.

This heating is likely to help the seal ring 104 adhere to the wall surfaces of the passage 103 to which the gate 102 is pressed against to effect tight sealing of the passage.

In conventional techniques, this adhesion has posed problems in which lifting the gate to establish gas flow necessarily has involved pulling the gate upward, with the gate still adhered to the passage wall surfaces, helping generate frittered particles occurring from frictional rubbing of contacted surfaces. In the present invention, however, when the valve is being opened, a separate step is first executed to pull the gate 102 sideways to thereby detach from the passage wall surfaces. This extra step is particularly useful in cases where a vacuum or near vacuum is established in the passage 103 so that the gate 102 would refuse to separate from the passage wall surfaces.

Thus, as in conventional arts, the present invention involves no movement of a gate with frictional contact, so that frittered particles do not occur.

The preferred embodiment described above is essentially a prototype comprising basic futures and might need to incorporate some other elements for use in some actual applications, such as for easier maintenance. Modification of this particular embodiment will serve such needs.

Referring to FIGS. 7A, 7B, 7C and 7D, a first modification of the stem 208 will be described in detail, in which the gate 202 has an improved heating unit. In the drawings, like parts are indicated by like numbers with or without an apostrophe. A heating pad 206 is weleded along an upper end portion thereof to a lower end of a stem 208. A substantially square groove 242 is formed circumferentially in one surface of the heating pad 206.

Fitted into the groove 242 is a linear heating element 243 provided to heat the heating pad 206. The cartridge heater 243, which is a linear heating element in this particular embodiment, is energized by an outside power unit, not shown, through a wire 244 passed through a prolonged hollow 241 axially defined in the stem 208. A seal plate 205 is seal welded to the heating pad 206 to cover the remaining surface of the latter not welded to the stem 208. Thus, the seal plate 205 tightly masks the groove 242, trapping the heating element 243.

A gate 202, which may preferably be equal to the size of the seal plate 205, is then mounted to overlay the seal plate. The gate 202 may be removably tightened in place with a screw 246 for easy maintenance or replacement.

A second modified form of the stem 308 will be explained with respect to FIGS. 8A, 8B, 8C and 8D. This particular modification is basically similar to the earlier version except that heating the gate 302 is effected by a different system. The groove 342 in the heating pad 306 is used to contain heat transmitting medium, not a heating wire, which is supplied through a head member 347 fixedly mounted on top of the stem 308. The medium is flowed in and out of the groove 342 through a supply passage 348 and exit passage 350 both laid in the hollow 341 of the stem 308.

The medium is supplied from a source, not shown, through an inlet port 347a provided in the head member 347 and flows through the supply passage 348 into the groove 342 through an L-shaped pipe 349. The medium, while heating the heating pad 305, circulates through the groove 342 and the exit passage 350, to flow out of an outlet port 347b back to the source for reheating.

What is claimed is:

1. A gate valve for regulating gas flow in semiconductor manufacturing equipment, comprising:

a gate mounted in a valve casing and adapted to close and open a passage of fluid, the gate being vertically and laterally movably disposed for positioning relative to the passage between a first upward neutral position, where the gate is held away from the passage, a second lower position, in which the gate stands to face the passage, and a third tilted position, under which the gate is inclined into pressure contact, through peripheral edges thereof, against opposed wall surfaces of the passage, the gate also being circumferentially fitted in one side thereof with a seal ring of rubber for sealing the passage in a fluid tight condition;

a vertical elongate valve stem axially coupled to and made integral at a lower end thereof with the gate, the valve stem including a bellows mounted in which the valve stem is shrouded, the bellows being adapted to engage about the valve stem in such a manner as to normally urge the valve stem upward to thereby hold the gate in the upper neutral position;

a valve stem holder fixedly mounted on top of the valve stem, the valve stem holder having a pair of horizontally jutted fulcrums affixed to opposite sides of the valve stem holder, the fulcrums being slidably engaged in a pair of vertically extending guide grooves defined in stationary surfaces in the valve casing, the guide grooves being adapted to arrest, in conjunction with the paired fulcrums coming into abutting contact with lower ends of the guide grooves, the valve stem holder when the valve stem is driven downward, at a point where the gate is just brought down to the second lower position;

a cam system vertically movably disposed for actuating the valve stem and mounted immediately above the valve stem holder and including a top plate, a cam casing seated below the top plate, and a pair of laterally arrayed cam disks that are slidably engaged in slanted guide grooves defined in opposite inside walls in the cam casing for movement between a first upright position and a second displaced position, the paired cam disks being supported at midpoint on a cam disk holder to which the paired cam disks are made integral and having a lateral pair of compression springs strung between the cam casing and the valve stem holder, the paired springs being adapted to normally urge the valve stem holder in axial alignment with the cam casing; and a pneumatic drive mounted on both sides of the valve stem and having a pair of vertically reciprocating piston rods operatively connected to opposite lateral end portions of the top plate for driving the valve stem, the fulcrums being adapted to guide the vertical travel of the valve stem to thereby drive the gate between the upper neutral position and the lower position, the fulcrums also being adapted to serve a pivot about which the valve stem holder is rotated against the force of the compression spring when the cam disks are caused to shift to the displaced position by exerting downside pressure on the cam casing beyond the point where the valve stem holder is halted by the fulcrums at the lower ends of the vertical guide grooves, the stroke of the pneumatic drive being designed so that a part of the piston rods' travel is used to vertically move the valve stem, with the remaining part being converted into a lateral shift of the gate relative to the passage wall surfaces through the cam disks that are caused to shift in the guide grooves of the cam casing to thereby move the valve stems relative to the cam casing.

2. A gate valve as set forth in claim 1, wherein a heater is mounted to heat the gate and a cylindrically shaped sheath heater mounted to surround the bellows.

3. A gate valve as set forth in claim 2, wherein the heater for the gate comprises a heating pad mounted for attachment to a surface of the gate, with a seal plate interposed therebetween for covering the pad, a linear heating element fittingly laid in a circumferential groove defined in one side of the heating pad, a length of electric wire electrically connected at one end thereof to the linear heating element for electricity conduction, the electric wire being passed through an axial elongated hollow defined in the valve stem and connected via a terminal mounted in the valve casing to an outside power source, the seal plate fluid-sealed to the heating pad, the gate being releasably bolted to the heating pad through the seat plate.

4. A gate valve as set forth in claim 2, wherein the heater for the gate comprising a heating pad mounted for attachment to a surface of the gate, with a seal plate interposed therebetween for covering the pad, a heating pipe fittingly laid in a groove circumferentially defined in one side of the heating pad and provided for conducting heat transfer medium for heating the gate, a pair of supply and exit passages mounted in an axial elongated hollow defined in the valve stem, the supply passage being connected to one end of the heating pipe, with the other end of the heating pipe being connected to the exit passage, the supply passage being connected to an outside source of heat transfer medium which is conducted to enter through the supply passage into the heating pipe and exit through the exit passage, the seal plate being fluid-sealed to the heating pad, the gate being releasably bolted to the heating pad through the seat plate.

* * * * *